United States Patent
Gonzalez

(10) Patent No.: US 8,964,888 B2
(45) Date of Patent: Feb. 24, 2015

(54) SYSTEM AND METHOD OF GENERATING A PRE-EMPHASIS PULSE

(75) Inventor: Jason Gonzalez, Solana Beach, CA (US)

(73) Assignee: QUALCOMM Incorporated, San Diego, CA (US)

(*) Notice: Subject to any disclaimer, the term of this patent is extended or adjusted under 35 U.S.C. 154(b) by 269 days.

(21) Appl. No.: 13/598,495

(22) Filed: Aug. 29, 2012

(65) Prior Publication Data

US 2014/0064404 A1 Mar. 6, 2014

(51) Int. Cl.
- *H04K 1/02* (2006.01)
- *H04B 1/04* (2006.01)
- *H04L 25/02* (2006.01)
- *H04L 25/03* (2006.01)

(52) U.S. Cl.
CPC .......... *H04B 1/0475* (2013.01); *H04L 25/0288* (2013.01); *H04L 25/03343* (2013.01); *H04L 25/03834* (2013.01)
USPC .......................................... 375/296; 375/298

(58) Field of Classification Search
CPC ................................................... H04B 1/0475
USPC ................................. 375/296, 298
See application file for complete search history.

(56) References Cited

U.S. PATENT DOCUMENTS

| | | | |
|---|---|---|---|
| 6,759,868 B2 | 7/2004 | Helt et al. | |
| 7,065,301 B2 | 6/2006 | Shastri et al. | |
| 7,586,330 B2 | 9/2009 | Kim | |
| 7,830,167 B2 | 11/2010 | Ono et al. | |
| 2002/0118042 A1* | 8/2002 | Helt et al. | 326/86 |
| 2003/0222802 A1* | 12/2003 | Greenstreet | 341/50 |
| 2009/0033365 A1* | 2/2009 | Miura | 326/82 |
| 2009/0296851 A1* | 12/2009 | Ono et al. | 375/295 |
| 2010/0283160 A1* | 11/2010 | Chandrasekaran | 257/777 |
| 2011/0228824 A1 | 9/2011 | Lutz | |
| 2011/0228871 A1 | 9/2011 | Lutz | |

OTHER PUBLICATIONS

International Search Report and Written Opinion—PCT/US2013/056049—ISA/EPO—Dec. 20, 2013.
Partial International Search Report—PCT/US2013/056049—ISA/EPO—Oct. 11, 2013.

* cited by examiner

*Primary Examiner* — Michael Neff
(74) *Attorney, Agent, or Firm* — Paul S. Holdaway

(57) ABSTRACT

A method includes detecting one or more of an upward transition of a single-ended data signal via a first driver path to a pre-emphasis transmitter or a downward transition of the single-ended data signal via a second driver path to the pre-emphasis transmitter. The method also includes generating a pre-emphasis pulse at the pre-emphasis transmitter in response to detecting the upward transition or the downward transition of the single-ended data signal.

39 Claims, 7 Drawing Sheets

SYSTEM AND METHOD OF GENERATING A PRE-EMPHASIS PULSE

I. FIELD

The present disclosure is generally related to generating a pre-emphasis pulse.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Circuitry within wireless telephones and other electronic devices may include transmitters to transmit a data signal through a communication channel, such as a differential signal that is transmitted through a serializer/deserializer (SER-DES) interface. Transmitting a data signal through a communication channel may degrade the data signal due to the electrical properties of the communication channel. For example, frequency content in transition edges of the data signal may be degraded due to a limited bandwidth of the communication channel and a high data rate associated with the data signal.

Pre-emphasis may be used to generate pulses and to combine the pulses with the data signal to boost frequency content in transition edges of the data signal prior to the data signal being transmitted over a communication channel. Boosting the frequency content in the transition edges of the data signal may compensate for data signal degradation during interconnect (i.e., when the data signal is propagated over the communication channel). However, typical pre-emphasis systems require additional digital logic and clocking mechanisms and consume additional power by generating pulses with a fixed width and strength that may exceed a pulse width and strength that is satisfactory for certain channel conditions.

III. SUMMARY

Systems and methods to generate a pre-emphasis pulse are disclosed. When a first driver path detects an upward signal transition of a data signal (e.g., from logic "0" to logic "1"), a first pre-emphasis input signal that indicates the upward signal transition may be provided to a pre-emphasis transmitter via the first driver path. When a second driver path detects a downward signal transition of the data signal (e.g., from logic "1" to logic "0"), a second pre-emphasis input signal that indicates the downward signal transition may be provided to the pre-emphasis transmitter via the second driver path. The pre-emphasis transmitter may generate a pre-emphasis pulse in response to receiving the first pre-emphasis input signal or the second pre-emphasis input signal. The pre-emphasis pulse may be generated having an adjustable pulse width and the use of any additional clocking mechanisms. The pre-emphasis pulse may be combined with the data signal to generate a combined signal and the combined signal is transmitted through a communication channel.

In a particular embodiment, a method includes detecting one or more of an upward transition of a single-ended data signal via a first driver path to a pre-emphasis transmitter or a downward transition of the single-ended data signal via a second driver path to the pre-emphasis transmitter. The method also includes generating a pre-emphasis pulse at the pre-emphasis transmitter in response to detecting the upward transition or the downward transition of the single-ended data signal.

In another particular embodiment, an apparatus includes a first driver path configured to detect an upward transition of a single-ended data signal. The apparatus further includes a second driver path configured to detect a downward transition of the single-ended data signal. The apparatus further includes a pre-emphasis transmitter coupled to the first driver path and to the second driver path. The pre-emphasis transmitter is configured to generate a pre-emphasis pulse in response to detecting the upward transition or the downward transition.

One particular advantage provided by at least one of the disclosed embodiments is an ability to generate a pre-emphasis pulse with an adjustable width and strength to at least partially compensate for degradation of a data signal that is sent over or through a communication channel, enabling lower power consumption as compared to systems that use a pre-emphasis pulse with a fixed width and strength. Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

Figure 6:
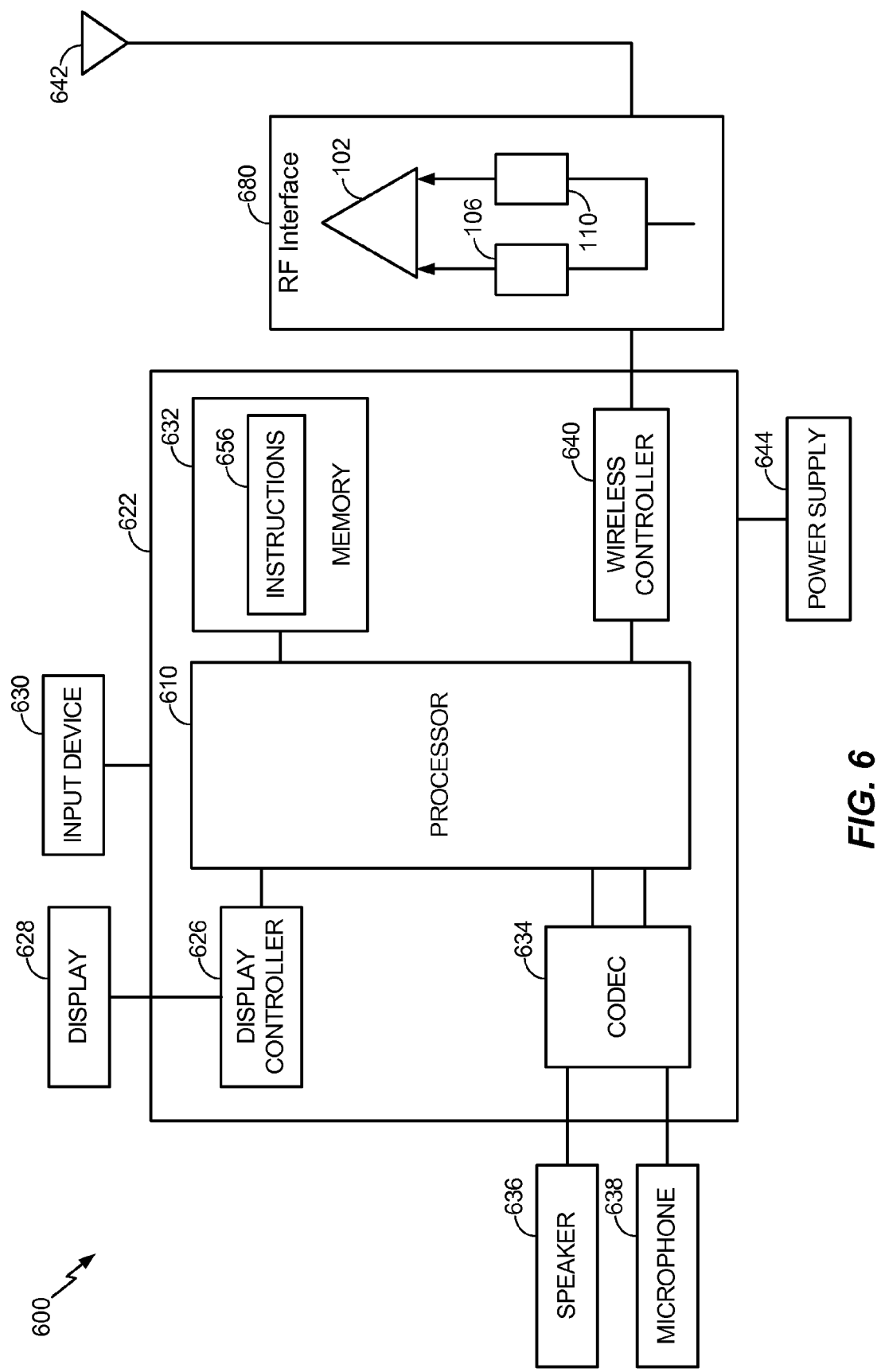
Figure 7:
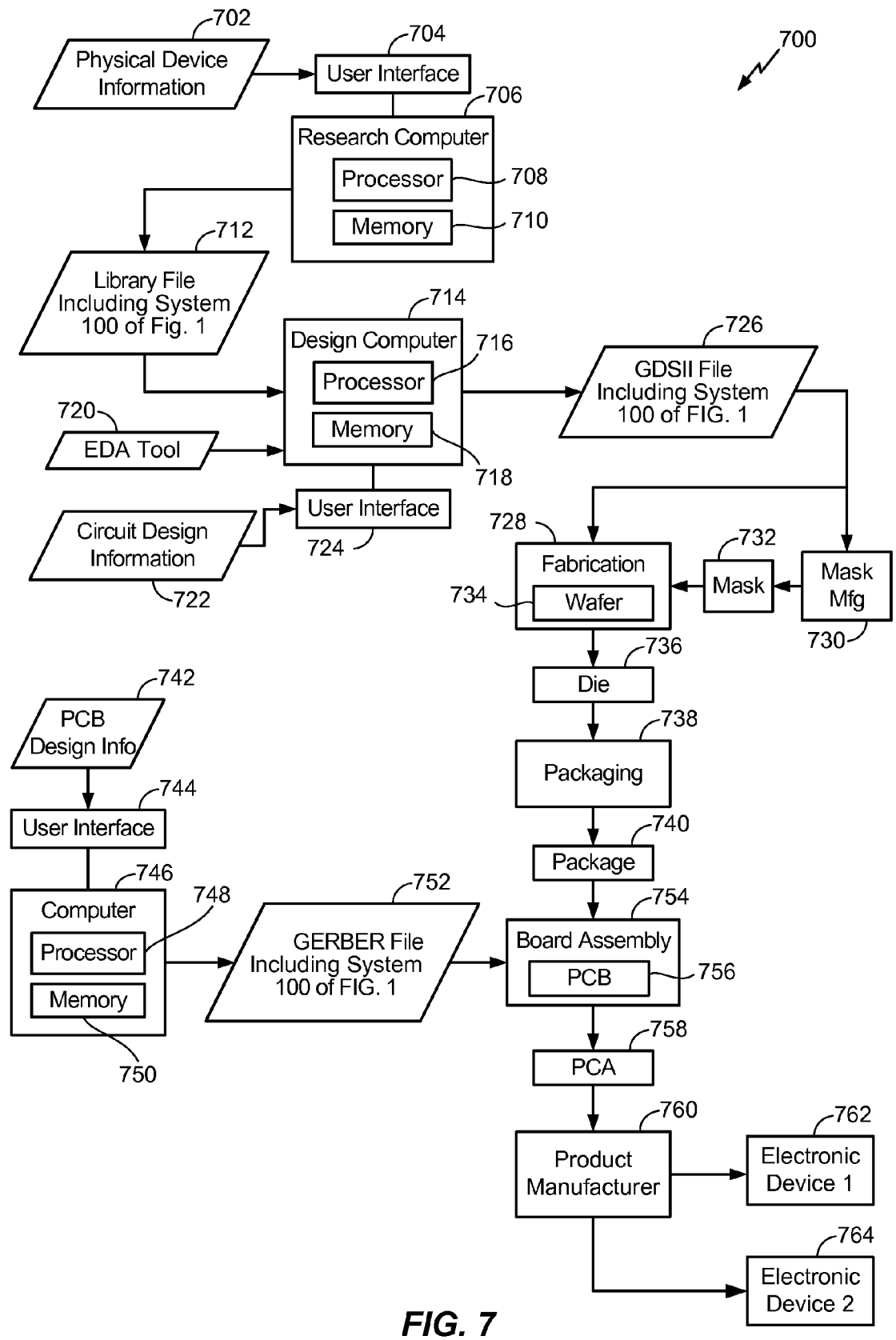

FIG. 6 is a block diagram of a wireless device including components operable to detect a signal transition of a data signal and to generate a pre-emphasis pulse; and FIG. 7 is a data flow diagram of a particular illustrative embodiment of a manufacturing process to manufacture electronic devices that include components operable to detect a signal transition of a data signal and to generate a pre-emphasis pulse.

V. DETAILED DESCRIPTION

Figure 1:
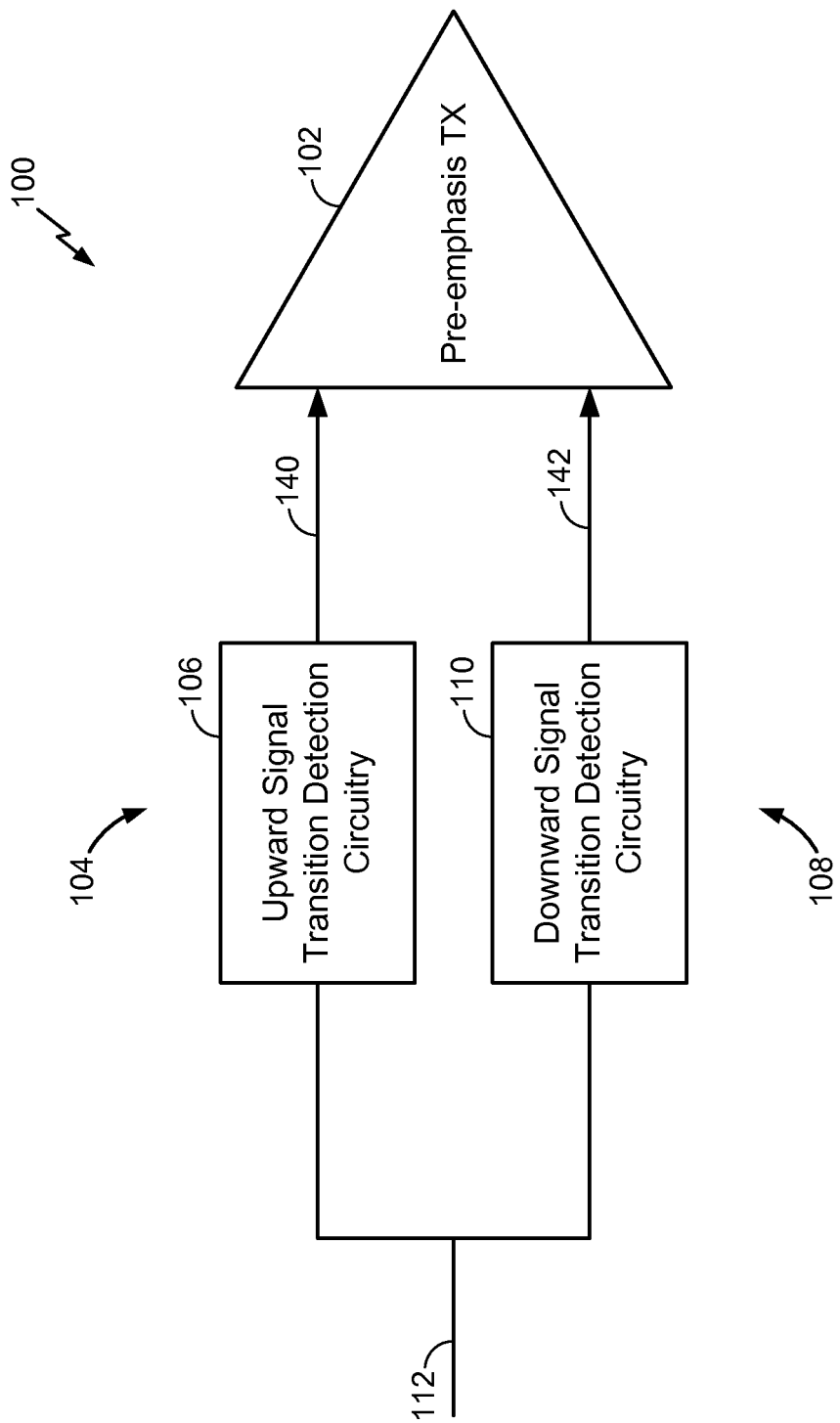
FIG. 1 is a block diagram of a particular illustrative embodiment of a system operable to detect a signal transition of a data signal and to generate a pre-emphasis pulse.

Referring to FIG. 1, a particular illustrative embodiment of a system 100 operable to detect a signal transition of a data signal and to generate a pre-emphasis pulse is shown. The system 100 includes a pre-emphasis transmitter 102, a first driver path 104, and a second driver path 108. The first driver path 104 is coupled to a first input of the pre-emphasis transmitter 102 and the second driver path 108 is coupled to a second input of the pre-emphasis transmitter 102. The first driver path 104 includes upward signal transition detection circuitry 106 and the second driver path 108 includes downward signal transition detection circuitry 110.

The upward signal transition detection circuitry 106 is configured to receive a data signal 112 and to detect when an upward signal transition of the data signal 112 occurs. For example, the upward signal transition detection circuitry 106 may detect when the data signal 112 transitions from a low logic level to a high logic level (e.g., from "0" to "1"). The upward signal detection circuitry 106 is further configured to generate a first pre-emphasis input signal 140 having a high logic level at a bit transmission time corresponding to when the upward signal transition of the data signal 112 occurs. The upward signal transition detection circuitry 106 is configured to provide the first pre-emphasis input signal 140 to the first input of the pre-emphasis transmitter 102. An illustrative embodiment of the upward signal detection circuitry 106 is described with respect to FIG. 2.

The downward signal transition detection circuitry 110 is configured to receive the data signal 112 and to detect when a downward signal transition of the data signal 112 occurs. For example, the downward signal transition detection circuitry 110 may detect when the data signal 112 transitions from a high logic level to a low logic level (e.g., from "1" to "0"). The downward detection circuitry 110 is further configured to generate a second pre-emphasis input signal 142 having a high logic level at a bit transmission time corresponding to when the downward signal transition of the data signal 112 occurs. The downward signal transition detection circuitry 110 is configured to provide the second pre-emphasis input signal 142 to the second input of the pre-emphasis transmitter 102. An illustrative embodiment of the downward signal detection circuitry 110 is described with respect to FIG. 2.

The pre-emphasis transmitter 102 is configured to receive the first pre-emphasis input signal 140 and the second pre-emphasis input signal 142 and to generate a pre-emphasis pulse based on the pre-emphasis input signals 140, 142. For example, the pre-emphasis transmitter 102 may generate a pre-emphasis pulse at a bit transmission time when a logic level of the first pre-emphasis input signal 140 is high. The pre-emphasis transmitter 102 may generate another pre-emphasis pulse at a bit transmission time when a logic level of the second pre-emphasis input signal 142 is high. Thus, the pre-emphasis transmitter 102 is configured to generate a first pre-emphasis pulse in response to the upward signal transition detection circuitry 106 detecting an upward transition of the data signal 112. Additionally, the pre-emphasis transmitter 102 is further configured to generate a second pre-emphasis pulse in response to the downward signal transition detection circuitry 110 detecting a downward transition of the data signal 112. The first pulse and the second pulse may have adjustable widths and strengths responsive to digital codes, as described with respect to FIGS. 2 and 3. An illustrative embodiment of the pre-emphasis transmitter 102 is described with respect to FIG. 3.

During operation, the data signal 112 is provided to the first driver path 104 of the pre-emphasis transmitter 102 and to the second driver path 108 of the pre-emphasis transmitter 102. The data signal 112 may be a single-ended data signal (i.e., a data signal having a first voltage level corresponding to a digital "1" and having a second voltage level corresponding to a digital "0"). The data signal 112 may have multiple signal transitions that occur at different bit transmission times throughout propagation such as illustrated and described with respect to FIG. 4. For example, the data signal 112 may transition from "0" to "1" (i.e., an upward signal transition) at a first bit transmission time resulting in an upward transition edge of the data signal 112 occurring at the first bit transmission time. In addition, the data signal 112 may transition from "1" to "0" (i.e., a downward signal transition) at a second bit transmission time resulting in a downward transition edge of the data signal 112 occurring at the second bit transmission time.

The upward signal transition detection circuitry 106 of the first driver path 104 detects an upward signal transition of the data signal 112 (e.g., detects an upward transition edge of the data signal 112) and generates a first pre-emphasis input signal 140 having a high logic level in response to detecting the upward signal transition. For example, when the data signal 112 transitions from "0" to "1" at the first bit transmission time, the upward signal transition detection circuitry 106 generates a first pre-emphasis input signal 140 having a high logic level and provides the first pre-emphasis input signal 140 to the pre-emphasis transmitter 102.

The downward signal transition detection circuitry 110 of the second driver path 108 detects a downward transition of the data signal 112 (e.g., detects a downward transition edge of the data signal 112) and generates a downward pre-emphasis input signal 142 having a high logic level in response to detecting the downward transition. For example, when the data signal 112 transitions from "1" to "0" at the second bit transmission time, the downward signal transition detection circuitry 110 generates a second pre-emphasis input signal 142 having a high logic level and provides the second pre-emphasis input signal 142 to the pre-emphasis transmitter 102.

The pre-emphasis transmitter 102 receives the first and second pre-emphasis input signals 140, 142 and generates a pre-emphasis pulse at bit transmission times corresponding to when either the first pre-emphasis input signal 140 has a high logic level or the second pre-emphasis input signal 142 has a high logic level. For example, the pre-emphasis transmitter 102 generates a pre-emphasis pulse when the upward signal transition circuitry 106 detects the upward transition of the data signal 112 at the first bit transmission time. In addition, the pre-emphasis transmitter 102 generates a pre-emphasis pulse when the downward signal transition circuitry 110 detects the downward transition of the data signal 112 at the second bit transmission time.

The system 100 of FIG. 1 may thus detect a signal transition (e.g., a upward transition or a downward transition) of the data signal 112 and generate a pre-emphasis pulse in response to detecting the signal transition. The pre-emphasis pulse compensates for degradation of the data signal 112 that may occur when the data signal 112 is transmitted over a communication channel. For example, the pre-emphasis pulse may be combined with a data transmission signal representing the data signal 112 to boost frequency content in transition edges of the data transmission signal prior to transmitting the data transmission signal over a communication channel.

Figure 2:
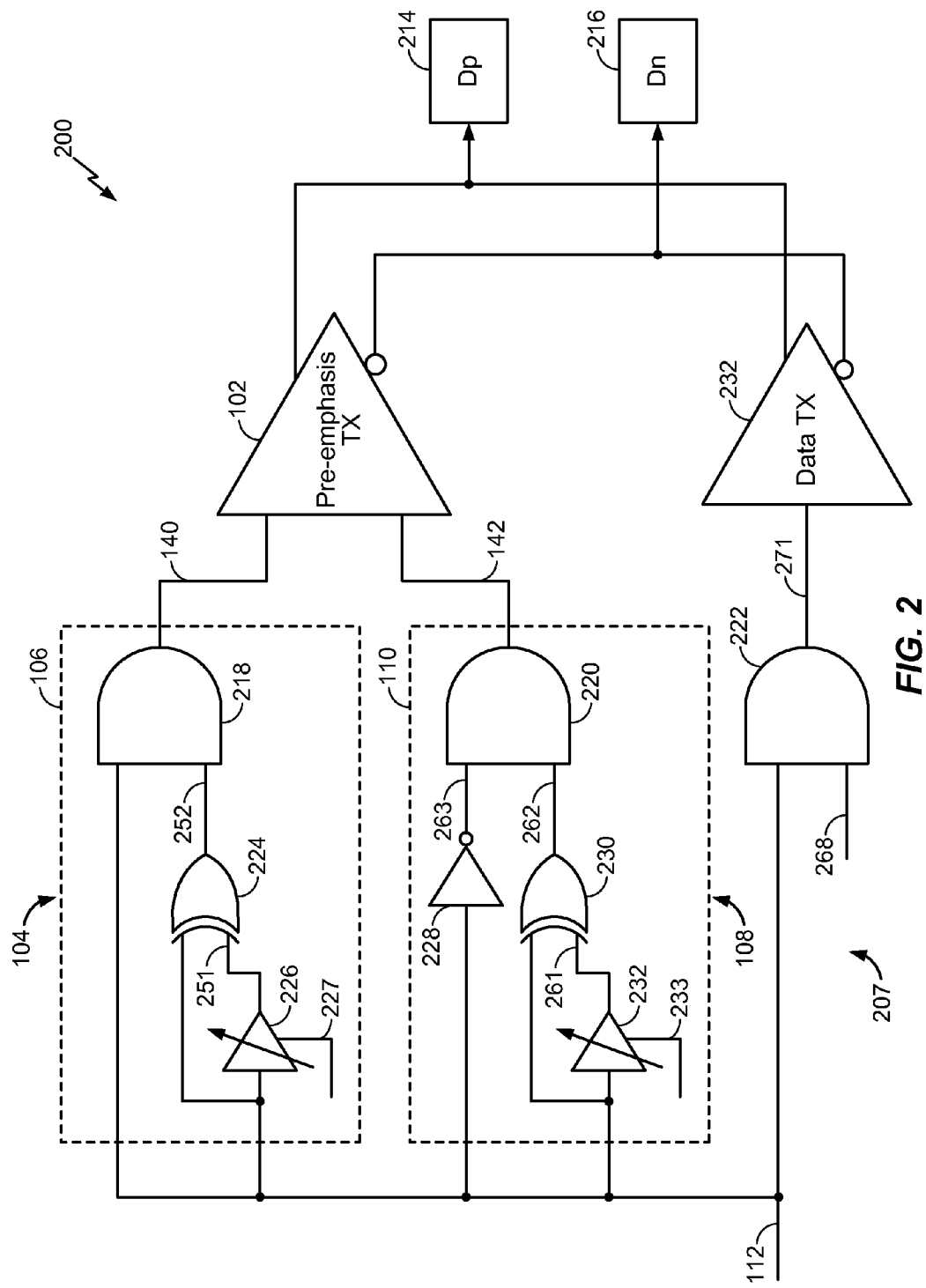
FIG. 2 is a diagram of a particular illustrative embodiment of a circuit operable to detect a signal transition of a data signal and to generate a pre-emphasis pulse.

Referring to FIG. 2, a particular illustrative embodiment of a circuit 200 operable to detect a signal transition of a data signal and generate a pre-emphasis pulse is shown. The circuit 200 includes the first driver path 104, the second driver path 108, and the pre-emphasis transmitter 102 of FIG. 1. The circuit 200 also includes a transmission data path 207 coupled to a data transmitter 232. Differential outputs of the data transmitter 232 are combined with pre-emphasis outputs of the pre-emphasis transmitter 102 to generate combined outputs. The combined outputs are coupled to a first pad 214 and to a second pad 216. The first pad 214 and the second pad 216 may be coupled to transmit the combined outputs over a wired communication channel or coupled to transmit the combined outputs over a wireless communication channel. The communication channel (i.e., the wired communication channel or the wireless communication channel) may include a differential signaling channel.

The first driver path 104 includes the upward signal transition detection circuitry 106. The upward signal transition detection circuitry 106 includes a first AND logic gate 218, a first exclusive-OR (XOR) logic gate 224, and a first programmable delay element 226. A signal path configured to propagate the data signal 112 is coupled to an input of the first programmable delay element 226, to a first input of the first XOR logic gate 224, and to a first input of the first AND logic gate 218. The first AND logic gate 218 is coupled to receive the data signal 112 at the first input and is coupled to receive an output of the first XOR logic gate 224 at a second input. The first XOR logic gate 224 is coupled to receive the data signal 112 at the first input and is coupled to receive an output of the first programmable delay element 226 at a second input. The first programmable delay element 226 is coupled to receive the data signal 112 and a first control signal 227. An output of the first AND logic gate 218 is coupled to the first input of the pre-emphasis transmitter 102.

The first programmable delay element 226 is configured to receive the data signal 112 and to generate a first delayed data signal 251 based on a delay time responsive to the first control signal 227. For example, the first control signal 227 may correspond to a first digital code that selectively controls a time delay associated with the first programmable delay element 226 (e.g., an amount of time it takes for the data signal 112 to propagate through the first programmable delay element 226). In a particular embodiment, the first programmable delay element 226 may be a chain of serially coupled inverters and the first control signal 227 may indicate a particular inverter in the chain having an output to be provided as the first delayed data signal 251. The first programmable delay element 226 is further configured to provide the first delayed data signal 251 to the second input of the first XOR logic gate 224.

The first XOR logic gate 224 is configured to receive the data signal 112 at a first input and to receive the first delayed data signal 251 (i.e., a delayed data signal 112) at the second input. The first XOR logic gate 224 is configured to generate a first transition signal 252 having a logic level based on a logic level of the data signal 112 and the first delayed data signal 251. For example, when the logic level of the data signal 112 is low and the logic level of the first data signal 251 is low, the logic level of the first transition signal 252 is low. When the data signal 112 transitions to a high logic level, the logic level of the data signal 112 is high while the logic level of the first delayed data signal 251 remains low and the logic level of the first transition signal 252 is high. After a delay time of the first programmable delay element 226, the first delayed data signal 251 transitions to a high logic level while the logic level of the data signal 112 remains high resulting in the first transition signal 252 transitioning to a logic low level. As a result, the first XOR logic gate 224 generates a pulse having a pulse width corresponding to the delay time of the first programmable delay element 226 in response to an upward transition of the data signal 112. Similarly, the first XOR logic gate 224 generates a pulse having a pulse width corresponding to the delay time of the first programmable delay element 226 in response to a downward transition of the data signal 112. Thus, the first XOR logic gate 224 may detect a signal transition of the data signal 112 by comparing the logic level of the data signal 112 and the logic level of the first delayed data signal 251.

The first AND logic gate 218 is configured to receive the data signal 112 at a first input and the first transition signal 252 at the second input. The first AND logic gate 218 is further configured to generate the first pre-emphasis input signal 140 having a logic level based on a logic level of the data signal 112 and the first transition signal 252. For example, when the logic level of the data signal 112 is high, the output of the first AND logic gate 218 substantially matches the first transition signal 252. When the logic level of the data signal 112 is low, the output of the first AND logic gate 218 is low. The output of the first AND logic gate 218 is provided to the first input of the pre-emphasis transmitter 102 as the first pre-emphasis input signal 140.

As explained above, the first transition signal 252 having a high logic level is indicative of a signal transition of the data signal 112. The first AND logic gate 218 is operable to propagate the signal transition when the signal transition corresponds to an upward transition based on a logic level of the data signal 112. For example, when the logic level of the data signal 112 is high, the logic level of the first pre-emphasis input signal 140 substantially matches the logic level of the first transition signal 252. Thus, when the logic level of the data signal 112 is high and the logic level of the first transition signal 252 is high (indicating that a signal transition of the data signal 112 has occurred), the first AND logic gate 218 propagates the first transition signal 252 indicating that the signal transition of the data signal 112 corresponds to an upward transition. Thus, the first driver path 104 is configurable to detect an upward transition of the data signal 112.

The second driver path 108 includes the downward signal transition detection circuitry 110. The downward signal transition detection circuitry 110 includes a second AND logic gate 220, an inverter 228, a second XOR logic gate 230, and a second programmable delay element 232. A signal path configured to propagate the data signal 112 is coupled to an input of the second programmable delay element 232, a first input of the second XOR logic gate 230, and to an input of the inverter 228. The second AND logic gate 220 is coupled to receive an inverted data signal 263 at a first input and an output of the second XOR logic gate 230 at a second input. The second XOR logic gate 230 is coupled to receive the data signal 112 at the first input and an output of the second programmable delay element 232 at a second input. The second programmable delay element 232 is coupled to receive the data signal 112 and a second control signal 233 that corresponds to a second digital code that selective controls a time delay associated with the second programmable delay element 232. An output 142 of the second AND logic gate 220 is coupled to the second input of the pre-emphasis transmitter 102.

In a similar manner as the first programmable delay element 226 and the first XOR logic gate 224, the second programmable delay element 232 is configured to generate a second delayed signal 261 based on a time delay responsive to the second control signal 233, and the second XOR logic gate 230 is configured to generate a second transition signal 262 having a logic level based on a logic level of the data signal 112 and the second delayed data signal 261. Thus, the second XOR logic gate 230 may detect a signal transition of the data signal 112 by comparing the logic level of the data signal 112 and the logic level of the second delayed data signal 261. The second AND logic gate 220 is operable to propagate the signal transition when the signal transition corresponds to a downward transition based on a logic level of the inverted data signal 263. For example, when the logic level of the inverted data signal 263 is high, the logic level of the second pre-emphasis input signal 142 substantially matches the logic level of the second transition signal 262. Thus, when the logic level of the inverted data signal 263 is high (e.g., the logic level of the data signal 112 is low) and the logic level of the second transition signal 262 is high (indicating that a signal transition of the data signal 112 has occurred), the second AND logic gate 220 propagates the second transition signal 262, indicating that the signal transition of the data signal 112 corresponds to a downward transition. Thus, the second driver path 108 is configurable to detect a downward transition of the data signal 112.

The transmission data path 207 includes a third AND logic gate 222. The signal path that is configured to propagate the data signal 112 is coupled to a first input of the third AND logic gate 222. The third AND logic gate 222 is configured to receive the data signal 112 and a third control signal 268 corresponding to a third digital code. The third control signal 268 may be programmable by the third digital code to selectively enable the third AND logic gate 222 to generate an output signal 271 that substantially matches the data signal 112. For example, the output signal 271 may have a high logic level when the data signal 112 has a high logic level and the output signal 271 may have a low logic level when the data signal 112 has a low logic level. Thus, the third control signal 268 is operable to determine whether the circuit 200 transmits a combined output (i.e., a data transmission signal combined with a pre-emphasis pulse) or only the pre-emphasis pulse over the communication channel. The third AND logic gate 222 is further configured to provide the output signal 271 to an input of the data transmitter 232.

The pre-emphasis transmitter 102 is configured to receive the first pre-emphasis input signal 140 and the second pre-emphasis input signal 142 and to generate pre-emphasis outputs (i.e., pre-emphasis pulses) based on the pre-emphasis input signals 140, 142. For example, the pre-emphasis transmitter 102 may generate a first pre-emphasis pulse at a bit transmission time when a logic level of the first pre-emphasis input signal 140 is high. In addition, the pre-emphasis transmitter 102 may generate a second pre-emphasis pulse at a bit transmission time when a logic level of the second pre-emphasis input signal 142 is high.

The data transmitter 232 is configured to receive the output signal 271 and generate differential outputs. The differential outputs of the data transmitter 232 are combined with the pre-emphasis outputs of the pre-emphasis transmitter 102 to generate a combined signal that is sent to the first pad 214 and to the second pad 216. The first pad 214 and the second pad 216 may be coupled to transmit the combined signal over a wired communication channel or over a wireless communication channel. For example, the communication channel may include a differential signaling channel operable to transmit the combined signal via a high-speed digital interface that is compatible with a low-voltage differential signaling (LVDS) standard, such as a high-definition multimedia interface (HDMI) communication channel.

During operation, the data signal 112 propagates through the transmission data path 207 associated with the data transmitter 232 and through the first and second driver paths 104, 108 associated with the pre-emphasis transmitter 102. The first driver path 104 detects when an upward transition of the data signal 112 occurs. For example, prior to a first bit transmission time, the data signal 112 may have a low logic level and the first programmable delay element 226 may generate a first delayed data signal 251 having a low logic level after a delay time based on the control signal 227. At the first bit transmission time, the data signal 112 transitions from the low logic level to a high logic level, the first XOR logic gate 224 generates a first transition signal 252 having a high logic level in response to the data signal 112 having a high logic level while the first delayed data signal 251 remains at a low logic level due to the delay time, and the first AND logic gate 218 generates a first pre-emphasis input signal 140 having a high logic level (i.e., indicating an upward transition of the data signal 112). The pre-emphasis transmitter 102 initiates a first pre-emphasis pulse (e.g., the pre-emphasis output) in response to receiving the first pre-emphasis input signal 140 with the high logic level at the first bit transmission time. When the first delayed data signal 251 transitions from the low logic level to a high logic level after the delay time expires, the first XOR logic gate 224 generates a first transition signal 252 having a low logic level, and the first AND logic gate 218 generates a first pre-emphasis input signal 140 having a low logic level. The pre-emphasis transmitter 102 terminates the first pre-emphasis pulse in response to receiving the first pre-emphasis input signal 140 with the low logic level.

The second driver path 108 detects when a downward transition of the data signal 112 occurs. For example, prior to a second bit transmission time, the data signal 112 may have a high logic level and the second programmable delay element 232 may generate a second delayed data signal 261 having a high logic level after a delay time based on the control signal 233. At the second bit transmission time, the data signal 112 transitions from the high logic level to a low logic level, the second XOR logic gate 230 generates a second transition signal 262 having a high logic level in response to the data signal 112 having a low logic level while the second delayed data signal 261 remains at a high logic level due to the delay time, and the second AND logic gate 220 generates a second pre-emphasis input signal 142 having a high logic level (i.e., indicating a downward transition of the data signal 112). The pre-emphasis transmitter 102 initiates a second pre-emphasis pulse (e.g., the pre-emphasis output) in response to receiving the second pre-emphasis input signal 142 with the high logic level at the second bit transmission time. When the second delayed data signal 261 transitions from the high logic level to a low logic level after the delay time expires, the second XOR logic gate 230 generates a second transition signal 262 having a low logic level, and the second AND logic gate 220 generates a second pre-emphasis input signal 142 having a low logic level. The pre-emphasis transmitter 102 terminates the second pre-emphasis pulse in response to receiving the first pre-emphasis input signal 142 with the low logic level.

The first and second pre-emphasis pulses generated by the pre-emphasis transmitter 102 and the differential outputs generated by data transmitter 232 are combined to generate a combined signal. The combined signal is provided to the first pad 214 and the second pad 216, and the first and second pads 214, 216 are coupled to transmit the combined signal over a communication channel (e.g., a wired communication channel or a wireless communication channel).

It will be appreciated that the circuit 200 of FIG. 2 may reduce power consumption and may increase an accuracy of compensation in response to data signal degradation that may occur during interconnect. For example, the first control signal 227 may be responsive to the first digital code to adjust (i.e., reduce) a delay time of the first programmable delay element 226. Accordingly, adjusting the delay time of the first programmable delay element 226 may correspond to adjusting the width of the first pre-emphasis pulse. For example, a width of the first pre-emphasis pulse may decrease as the delay time of the first programmable delay element decreases. In a similar manner, the second control signal 233 may be responsive to the second digital code to reduce a delay time of the second programmable delay element 232, reducing a width of the second pre-emphasis pulse. By generating pre-emphasis pulses with adjustable widths, a pre-emphasis pulse with a reduced width may be generated which may result in lower power consumption at the pre-emphasis transmitter 102 when generating the pre-emphasis pulse. Further, generating a pre-emphasis pulse with a reduced width may result in the duration of the pre-emphasis pulse corresponding to a time segment that is more accurately tuned to the data signal 112 transition.

Figure 3:
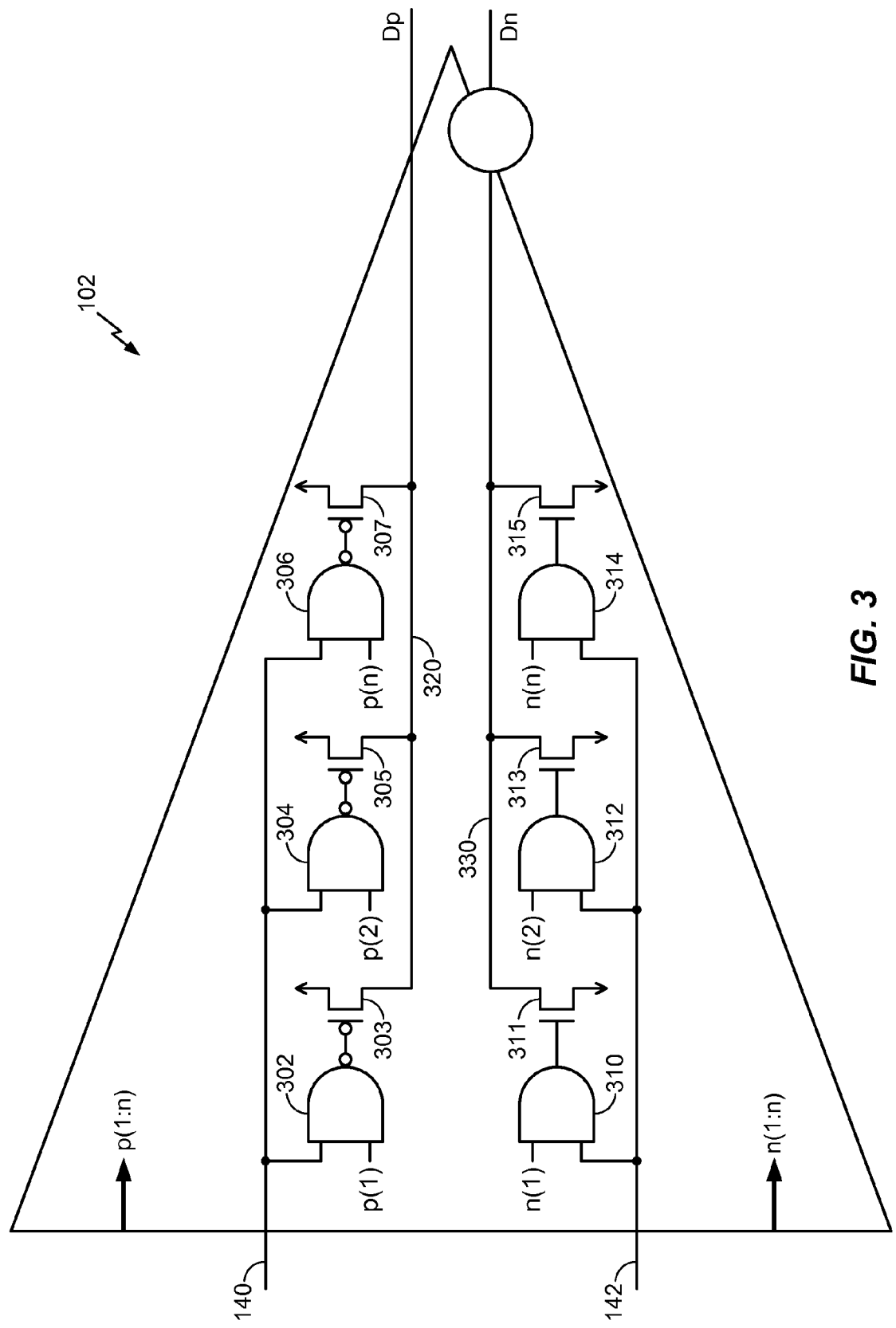
FIG. 3 is a diagram of a particular illustrative embodiment of a pre-emphasis transmitter operable to generate a pre-emphasis pulse.

Referring to FIG. 3, a particular illustrative embodiment of the pre-emphasis transmitter 102 operable to generate the pre-emphasis pulse is shown. The pre-emphasis transmitter 102 includes a first set of circuitry configurable to generate a first pulse in response to the first driver path 104 of FIG. 1 detecting an upward transition of the data signal 112 and a second set of circuitry configurable to generate a second pulse in response to the second driver path 108 of FIG. 1 detecting a downward transition of the data signal 112.

The first set of circuitry includes a first NAND logic gate 302, a second NAND logic gate 304, and one or more other NAND logic gates, such as an Nth NAND logic gate 306, where N is an integer greater than two. The first set of circuitry further includes a first p-type metal oxide semiconductor (PMOS) transistor 303, a second PMOS transistor 305, and an Nth PMOS transistor 307. A signal path that propagates the first pre-emphasis input signal 140 is coupled to a first input of the first NAND logic gate 302, a first input of the second NAND logic gate 304, and to a first input of the Nth NAND logic gate 306. An output of the first NAND logic gate 302 is coupled to a gate of the first PMOS transistor 303, an output of the second NAND logic gate 304 is coupled to a gate of the second PMOS transistor 305, and an output of the Nth NAND logic gate 306 is coupled to a gate of the Nth PMOS transistor 307.

The first NAND logic gate 302 is configured to receive the first pre-emphasis input signal 140 at a first input and a first pull-up digital code p(1) at a second input. The first NAND logic gate 302 is further configured to selectively activate the first PMOS transistor 303 based on a logic level of the first pre-emphasis input signal 140 and based on the first pull-up digital code p(1) provided to the second input of the first NAND logic gate 302. For example, the first NAND logic gate 302 may activate the first PMOS transistor 303 when the first pre-emphasis input signal 140 has a high logic level and the first pull-up digital code p(1) corresponds to a high logic level. The first PMOS transistor 303 is configured to selectively increase a current density at a node 320 based on an output of the first NAND logic gate 303. For example, the first PMOS transistor 303 may function as a pull-up transistor and may increase the current density of the node 320 based on a current supply upon activation.

The second NAND logic gate 304 is configured to receive the first pre-emphasis input signal 140 at a first input and a second pull-up digital code p(2) at a second input. The second NAND logic gate 304 is further configured to selectively activate the second PMOS transistor 305 based on a logic level of the first pre-emphasis input signal 140 and based on the second pull-up digital code p(2) provided to the second input of the second NAND logic gate 304. The Nth NAND logic gate 306 is configured to receive the first pre-emphasis input signal 140 at a first input and an Nth pull-up digital code p(n) at a second input. The Nth NAND logic gate 306 is further configured to selectively activate the Nth PMOS transistor 307 based on a logic level of the first pre-emphasis input signal 140 and based on the Nth pull-up digital code p(n) provided to the second input of the Nth NAND logic gate 306.

The second set of circuitry includes a first AND logic gate 310, a second AND logic gate 312, and one or more other AND logic gates, such as an Nth AND logic gate 314. The second set of circuitry further includes a first n-type metal oxide semiconductor (NMOS) transistor 311, a second NMOS transistor 313, and an Nth NMOS transistor 315. A signal path that propagates the second pre-emphasis input signal 142 is coupled to a first input of the first AND logic gate 310, a first input of the second AND logic gate 312, and to a first input of the Nth AND logic gate 314. An output of the first AND logic gate 310 is coupled to a gate of the first NMOS transistor 311, an output of the second AND logic gate 312 is coupled to a gate of the second NMOS transistor 313, and an output of the Nth AND logic gate 314 is coupled to a gate of the Nth NMOS transistor 315.

The first AND logic gate 310 is configured to receive the second pre-emphasis input signal 142 at a first input and a first pull-down digital code n(1) at a second input. The first AND logic gate 310 is further configured to selectively activate the first NMOS transistor 311 based on a logic level of the second pre-emphasis input signal 142 and based on the first pull-down digital code n(1). For example, the first AND logic gate 310 may activate the first NMOS transistor 311 when the second pre-emphasis input signal 142 has a high logic level and the first pull-down digital code n(1) corresponds to a high logic level. The first NMOS transistor 311 is configured to selectively increase a current density of a node 330 (e.g., increase a magnitude of current provided to the node 330) based on an output of the first AND logic gate 310. For example, the first NMOS transistor 311 may function as a pull-down transistor and increase the current density of the node 330 by providing a current path to ground upon activation.

The second AND logic gate 312 is configured to receive the second pre-emphasis input signal 142 at a first input and a second pull-down digital code n(2) at a second input. The second AND logic gate 312 is further configured to selectively activate the second NMOS transistor 313 based on a logic level of the second pre-emphasis input signal 142 and based on the second pull-down digital code n(2) provided to the second input of the second AND logic gate 312. The Nth AND logic gate 314 is configured to receive the second pre-emphasis input signal 142 at a first input and an Nth pull-down digital code n(n) at a second input. The Nth AND logic gate 314 is further configured to selectively activate the Nth NMOS transistor 315 based on a logic level of the second pre-emphasis input signal 142 and based on the Nth pull-down digital code n(n) provided to the second input of the Nth AND logic gate 314.

During operation, the first set of circuitry selectively increases the current density of the node 320 (e.g., initiates the first pre-emphasis pulse) when the first pre-emphasis input signal 140 corresponds to a high logic level and decreases the current density of the node 320 (e.g., terminates the first pre-emphasis pulse) when the first pre-emphasis input signal 140 corresponds to a low logic level.

An amount of current that is provided to the node 320 may be programmable by selectively enabling one or more pull-up transistors via the pull-up digital codes p(1:n). Thus, a first strength of the first pre-emphasis pulse may be programmable and/or adjustable by the pull-up digital codes p(1:n). When the first pre-emphasis input signal 140 corresponds to a low logic level, the first, second, and Nth NAND logic gates 302, 304, 306 deactivate the first, second, and Nth PMOS transistors 303, 305, 307, respectively, terminating the first pre-emphasis pulse.

The second set of circuitry selectively increases the current density of the node 330 (e.g., initiates the second pre-emphasis pulse) when the second pre-emphasis input signal 142 corresponds to a high logic level and decreases the current density of the node 330 (e.g., terminates the second pre-emphasis pulse) when the second pre-emphasis input signal 142 corresponds to a low logic level.

An amount of current that is provided to the node 330 may be programmable by selectively enabling pull-down transistors via the pull-down digital codes n(1:n). Thus, a second strength of the second pre-emphasis pulse may be programmable and/or adjustable by the pull-down digital codes n(1:n). When the second pre-emphasis input signal 140 corresponds to a low logic level, the first, second, and Nth AND logic gates 310, 312, 314 deactivate the first, second, and Nth PMOS transistors 311, 313, 315, respectively, terminating the second pre-emphasis pulse.

It will be appreciated that the pre-emphasis transmitter 102 of FIG. 3 may selectively increase and decrease a strength of the first pre-emphasis pulse and the second pre-emphasis pulse via digital codes. For example, the pull-up digital codes p(1:n) may selectively increase the first strength of the first pre-emphasis pulse by selectively activating one or more of the PMOS transistors 303, 305, 307 when the first pre-emphasis input signal 140 has a high logic level. In addition, the pull-down digital codes n(1:n) may selectively increase the second strength of the second pre-emphasis pulse by selectively activating one or more of the NMOS transistors 311, 313, 315 when the second pre-emphasis input signal 142 has a high logic level. Increasing the strength of the pre-emphasis pulses may improve compensation for signal degradation of the data signal 112 that may occur during interconnect, and decreasing the strength of the pre-emphasis pulses may conserve power. For example, increasing the strength of the pre-emphasis pulses may boost the transition edges of the data signal 112 at a greater rate when a signal transition of the data signal 112 occurs. Decreasing the strength of the pre-emphasis pulse may include activating fewer PMOS transistors 303, 305, 307 and fewer NMOS transistors 311, 313, 315, which may conserve dynamic usage power.

Figure 4:
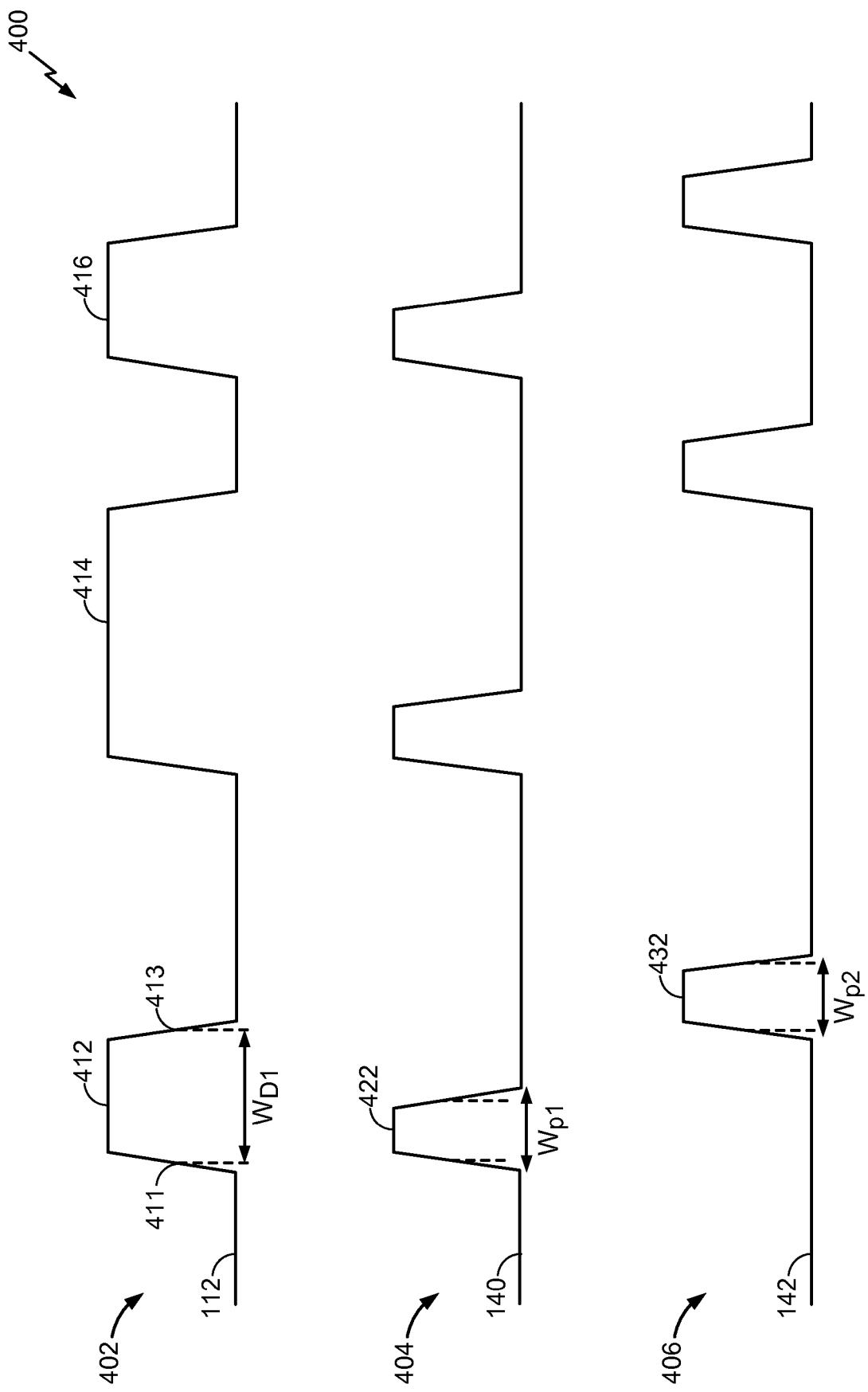
FIG. 4 is a timing diagram of a particular illustrative embodiment of a data signal and detected transitions of the data signal.

Referring to FIG. 4, a timing diagram 400 of a particular illustrative embodiment of the data signal 112, the first pre-emphasis input signal 140, and the second pre-emphasis input signal 142. The set of timing diagrams 400 includes a first trace 402, a second trace 404, and a third trace 406.

The first trace 402 illustrates signal transitions of the data signal 112. The data signal 112 includes a first data signal pulse 412, a second data signal pulse 414, and a third data signal pulse 416. Each data signal pulse 412, 414, 416 includes an upward and downward signal transition of the data signal 112. For example, the first data signal pulse 412 includes a first upward transition 411 of the data signal 112 at a first bit transmission time and a first downward transition 413 of the data 112 at a second bit transmission time. A width ($W_{D1}$) of the first data signal pulse 412 may correspond to a period of time between the first bit transmission time and the second bit transmission time.

The second trace 404 corresponds to the first pre-emphasis input signal 140. When the first driver path 104 detects the first upward transition 411 of the data signal 112 at the first bit transmission time, the logic level of the first pre-emphasis input signal 140 goes to a high value and then returns to a low value (e.g., corresponding to the first pre-emphasis pulse 422). As explained with respect to FIG. 2, a first width ($W_{p1}$) of the first pre-emphasis pulse 422 corresponds to the delay time of the first programmable delay element 226. Thus, the first width ($W_{p1}$) of the first pre-emphasis pulse 422 may be programmable and/or adjustable by the first control signal 227 that corresponds to the first digital code. The first width ($W_{p1}$) may be less that the width ($W_{D1}$) of the first data signal pulse 412.

The third trace 406 corresponds to the second pre-emphasis input signal 142. When the second driver path 108 detects the first downward transition 413 of the data signal 112 at the second bit transmission time, the logic level of the second pre-emphasis input signal 142 goes to a high value and then returns to a low value (e.g., corresponding to the second pre-emphasis pulse 432). As explained with respect to FIG. 2, a second width ($W_{p2}$) of the second pre-emphasis pulse 432 corresponds to the delay time of the second programmable delay element 232. Thus, the second width ($W_{p2}$) of the second pre-emphasis pulse 432 may be programmable and/or adjustable by the second control signal 233 that corresponds to the second digital code. The second width ($W_{p2}$) may be less that the width ($W_{D1}$) of the first data signal pulse 412. In a particular embodiment, the second width ($W_{p2}$) may be equal to the first width ($W_{p1}$). In another particular embodiment, the second width ($W_{p2}$) and the first width ($W_{p1}$) may be different.

Figure 5:
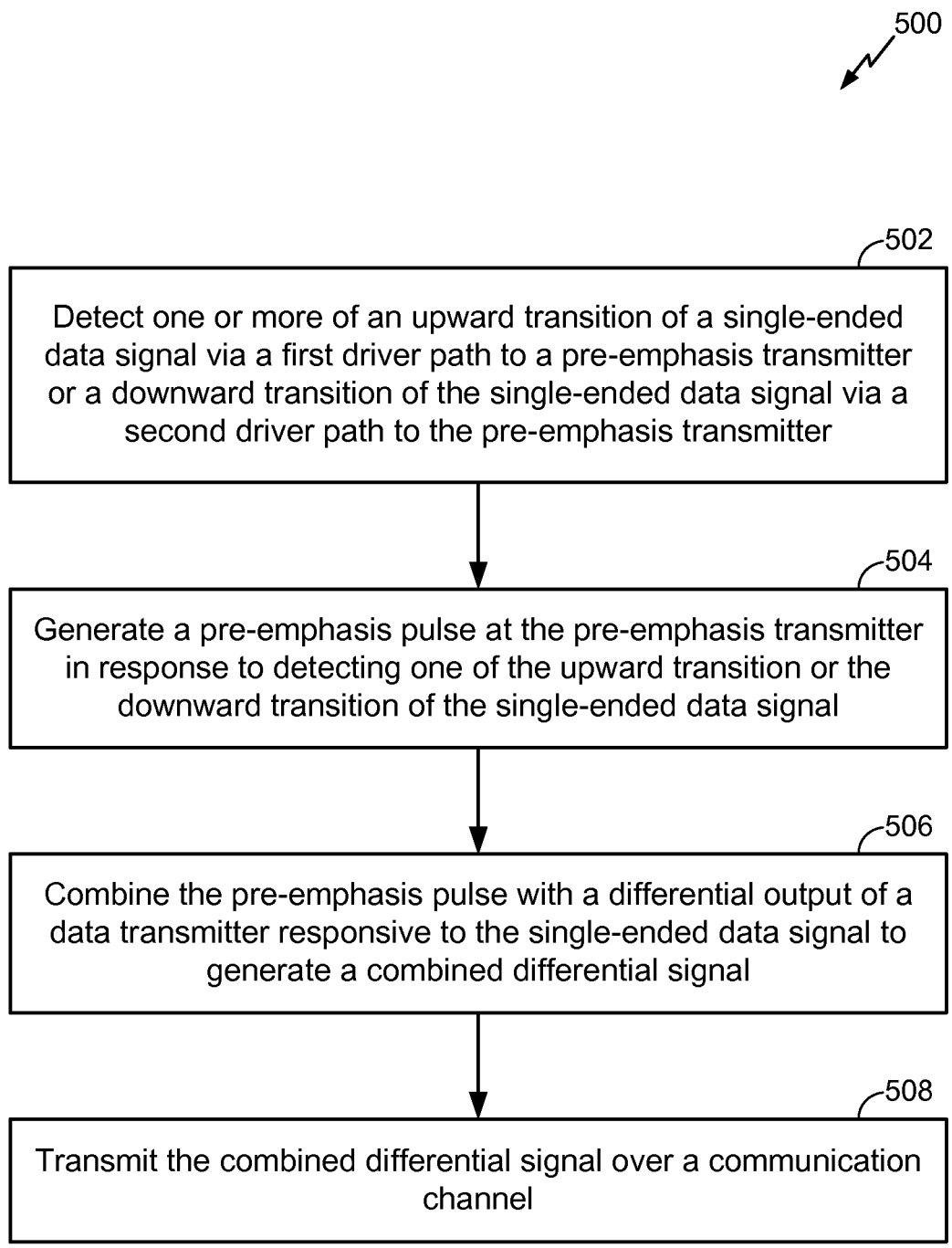
FIG. 5 is a flowchart of a particular embodiment of a method of generating a pre-emphasis pulse.

Referring to FIG. 5, a flowchart of a particular embodiment of a method 500 of generating a pre-emphasis pulse is shown. In an illustrative embodiment, the method 500 may be performed using the system 100 of FIG. 1, the circuit 200 of FIG. 2, or the pre-emphasis transmitter 102 of FIG. 3.

The method 500 includes detecting one or more of an upward transition of a single-ended data signal via a first driver path to a pre-emphasis transmitter or a downward transition of the single-ended data signal via a second driver path to the pre-emphasis transmitter, at 502. For example, in FIG. 1, an upward transition of the data signal 112 may be detected via the first driver path 104 to the pre-emphasis transmitter 102. In particular, the upward signal transition detection circuitry 106 of the first driver path 104 may detect an upward transition of the data signal 112. A downward transition of the data signal 112 may be detected via the second driver path 108 to the pre-emphasis transmitter 102. In particular, the downward signal transition detection circuitry 110 of the second driver path 108 may detect a downward transition of the data signal 112.

A pre-emphasis pulse may be generated at the pre-emphasis transmitter in response to detecting one of the upward transition or the downward transition of the single-ended data signal, at 504. For example, in FIG. 1, the pre-emphasis transmitter 102 may generate a pre-emphasis pulse in response to the upward signal transition detection circuitry 106 detecting an upward transition of the data signal 112 or in response to the downward signal transition detection circuitry 110 detecting a downward transition of the data signal 112.

The pre-emphasis pulse may be combined with a differential output of a data transmitter responsive to the single-ended data signal to generate a combined signal, at 506. For example, in FIG. 2, the first and second pre-emphasis pulses generated by the pre-emphasis transmitter 102 and the differential outputs generated by data transmitter 232 corresponding to the data signal 112 are combined and a combined signal is provided to the first and second pads 214, 216.

The combined signal may be transmitted over a communication channel, at 508. For example, in FIG. 2, the first pad 214 and the second pad 216 may be coupled to transmit the combined signal over a communication channel (i.e., a wired communication channel or a wireless communication channel).

The method 500 may thus detect a signal transition (e.g., a upward transition or a downward transition) of a data signal 112 and generate a pre-emphasis pulse in response to detecting the signal transition to compensate for degradation of the data signal 112 that may occur when the data signal 112 is transmitted through a communication channel. The pre-emphasis pulse may be combined with the data signal 112 to boost frequency content in transition edges of the data signal 112. The data signal 112 with the boosted frequency content is transmitted over a communication channel.

Referring to FIG. 6, a block diagram of wireless device 600 including components operable to detect a signal transition of a data signal and to generate a pre-emphasis pulse is shown. The device 600 includes a processor 610, such as a digital signal processor (DSP), coupled to a memory 632.

FIG. 6 also shows a display controller 626 that is coupled to the processor 610 and to a display 628. A coder/decoder (CODEC) 634 can also be coupled to the processor 610. A speaker 636 and a microphone 638 can be coupled to the CODEC 634. FIG. 6 also indicates that a wireless controller 640 can be coupled to the processor 610 and to a wireless antenna 642 via a radio frequency (RF) interface 680.

In a particular embodiment, the RF interface 680 is disposed between the wireless controller 640 and the wireless antenna 642 and includes the pre-emphasis transmitter 102 of FIG. 1 coupled to the upward signal transition detection circuitry 106 of FIG. 1 and to the downward signal transition detection circuitry 110 of FIG. 1. In a particular embodiment, the upward signal transition detection circuitry 106 may detect upward transitions of the data signal 112 of FIG. 1 and the downward signal transition detection circuitry 110 may detect downward transitions of the data signal 112. The pre-emphasis transmitter 102 may generate a pre-emphasis pulse in response to either the upward signal transition detection circuitry 106 or the down transition detection circuitry 110 detecting a transition. In a particular embodiment, the pre-emphasis transmitter 102 may perform at least a portion of the method 500 of FIG. 5.

The memory 632 may be a tangible non-transitory processor-readable storage medium that includes executable instructions 656. The instructions 656 may be executed by a processor, such as the processor 610 or a processor within the RF interface 680 to generate a pre-emphasis pulse in response to detecting one of an upward or downward transition of a single-ended data signal. For example, the instructions 656 may be executable by the processor 610 to set the first digital code corresponding to the first control signal 227, to set the second digital code corresponding to the second control signal 233, to set the pull-up digital codes p(1:n) corresponding to the NAND logic gates 302, 304, 306, to set the pull-down digital codes n(1:n) corresponding to the AND logic gates 310, 312, 314, or any combination thereof. The instructions 656 may be executable by the processor 610 to monitor a channel condition of the communication channel. For example, the instructions 656 may be executable by the processor 610 to monitor process, voltage, and temperature (PVT) variations of the communication channel and to adjust the strength and width of the pre-emphasis pulse via digital codes in response to the PVT variations.

In a particular embodiment, the processor 610, the display controller 626, the memory 632, the CODEC 634, and the wireless controller 640 are included in a system-in-package or system-on-chip device 622. In a particular embodiment, an input device 630 and a power supply 644 are coupled to the system-on-chip device 622. Moreover, in a particular embodiment, as illustrated in FIG. 6, the display 628, the input device 630, the speaker 636, the microphone 638, the wireless antenna 642, and the power supply 644 are external to the system-on-chip device 622. However, each of the display 628, the input device 630, the speaker 636, the microphone 638, the wireless antenna 642, and the power supply 644 can be coupled to a component of the system-on-chip device 622, such as an interface or a controller.

In conjunction with the described embodiments, an apparatus is disclosed that includes means for detecting an upward transition of a single-ended data signal at a first driver path. For example, the means for detecting the upward transition of the single-ended data signal may include the upward signal transition detection circuitry 106 of FIG. 1 including the first AND logic gate 218 of FIG. 2, the first XOR logic gate 224 of FIG. 2, the first programmable delay element 226 of FIG. 2, the processor 610 programmed to execute the instructions 656 of FIG. 6, one or more other devices, circuits, modules, or instructions to detect an upward transition of a single-ended data signal, or any combination thereof.

The apparatus may also include means for detecting a downward transition of a single-ended data signal at a second driver path. For example, the means for detecting the downward transition of the single-ended data signal may include the downward signal transition detection circuitry 108 of FIG. 1 including the second AND logic gate 220 of FIG. 2, the inverter 228 of FIG. 2, the second XOR logic gate 230 of FIG. 2, the second programmable delay element 232 of FIG. 2, the processor 610 programmed to execute the instructions 656 of FIG. 6, one or more other devices, circuits, modules, or instructions to detect a downward transition of a single-ended data signal, or any combination thereof.

The apparatus may further include means for generating a pre-emphasis pulse in response to the means for detecting the upward transition or the means for detecting the downward transition. For example, the means for generating the pre-emphasis pulse may include the pre-emphasis transmitter 102 of FIG. 1 including the first NAND logic gate 302 of FIG. 3, the second NAND logic gate 304 of FIG. 3, the Nth NAND logic gate 306 of FIG. 3, the first PMOS transistor 303 of FIG. 3, the second PMOS transistor 305 of FIG. 3, the Nth PMOS transistor of FIG. 3, the first AND logic gate 310 of FIG. 3, the second AND logic gate 312 of FIG. 3, the Nth AND logic gate 314 of FIG. 3, the first NMOS transistor 311 of FIG. 3, the second NMOS transistor 313 of FIG. 3, the Nth NMOS transistor 315 or FIG. 3, the processor 610 programmed to execute the instructions 656 of FIG. 6, one or more other devices, circuits, modules, or instructions to generate a pre-emphasis pulse, or any combination thereof.

The foregoing disclosed devices and functionalities may be designed and configured into computer files (e.g. RTL, GDSII, GERBER, etc.) stored on computer readable media. Some or all such files may be provided to fabrication handlers who fabricate devices based on such files. Resulting products include semiconductor wafers that are then cut into semiconductor die and packaged into a semiconductor chip. The chips are then employed in devices described above. FIG. 7 depicts a particular illustrative embodiment of an electronic device manufacturing process 700.

Physical device information 702 is received at the manufacturing process 700, such as at a research computer 706. The physical device information 702 may include design information representing at least one physical property of a semiconductor device that includes the system 100 of FIG. 1, the circuit 200 of FIG. 2, the pre-emphasis transmitter 102 of FIG. 3, the instructions 656 executable by the processor 610 of FIG. 6, the RF interface 680 of FIG. 6, or any combination thereof. For example, the physical device information 702 may include physical parameters, material characteristics, and structure information that is entered via a user interface 704 coupled to the research computer 706. The research computer 706 includes a processor 708, such as one or more processing cores, coupled to a computer readable medium such as a memory 710. The memory 710 may store computer readable instructions that are executable to cause the processor 708 to transform the physical device information 702 to comply with a file format and to generate a library file 712.

In a particular embodiment, the library file 712 includes at least one data file including the transformed design information. For example, the library file 712 may include a library of semiconductor devices including the system 100 of FIG. 1, the circuit 200 of FIG. 2, the pre-emphasis transmitter 102 of FIG. 3, the instructions 656 executable by the processor 610 of FIG. 6, the RF interface 680 of FIG. 6, or any combination thereof, that is provided for use with an electronic design automation (EDA) tool 720.

The library file 712 may be used in conjunction with the EDA tool 720 at a design computer 714 including a processor 716, such as one or more processing cores, coupled to a memory 718. The EDA tool 720 may be stored as processor executable instructions at the memory 718 to enable a user of the design computer 714 to design a device that includes the system 100 of FIG. 1, the circuit 200 of FIG. 2, the pre-emphasis transmitter 102 of FIG. 3, the instructions 656 executable by the processor 610 of FIG. 6, the RF interface 680 of FIG. 6, or any combination thereof. For example, a user of the design computer 714 may enter circuit design information 722 via a user interface 724 coupled to the design computer 714. The circuit design information 722 may include design information representing at least one physical property of a semiconductor device that includes the system 100 of FIG. 1, the circuit 200 of FIG. 2, the pre-emphasis transmitter 102 of FIG. 3, the instructions 656 executable by the processor 610 of FIG. 6, the RF interface 680 of FIG. 6, or any combination thereof. To illustrate, the circuit design property may include identification of particular circuits and relationships to other elements in a circuit design, positioning information, feature size information, interconnection information, or other information representing a physical property of a semiconductor device.

The design computer 714 may be configured to transform the design information, including the circuit design information 722, to comply with a file format. To illustrate, the file formation may include a database binary file format representing planar geometric shapes, text labels, and other information about a circuit layout in a hierarchical format, such as a Graphic Data System (GDSII) file format. The design computer 714 may be configured to generate a data file including the transformed design information, such as a GDSII file 726 that includes information describing a device that includes the system 100 of FIG. 1, the circuit 200 of FIG. 2, the pre-emphasis transmitter 102 of FIG. 3, the instructions 656 executable by the processor 610 of FIG. 6, the RF interface 680 of FIG. 6, or any combination thereof, and that also includes additional electronic circuits and components within the SOC.

The GDSII file 726 may be received at a fabrication process 728 to manufacture a semiconductor device that includes the system 100 of FIG. 1, the circuit 200 of FIG. 2, the pre-emphasis transmitter 102 of FIG. 3, the instructions 656 executable by the processor 610 of FIG. 6, the RF interface 680 of FIG. 6, or any combination thereof, according to transformed information in the GDSII file 726. For example, a device manufacture process may include providing the GDSII file 726 to a mask manufacturer 730 to create one or more masks, such as masks to be used with photolithography processing, illustrated as a representative mask 732. The mask 732 may be used during the fabrication process to generate one or more wafers 734, which may be tested and separated into dies, such as a representative die 736. The die 736 includes a circuit including the system 100 of FIG. 1, the circuit 200 of FIG. 2, the pre-emphasis transmitter 102 of FIG. 3, the instructions 656 executable by the processor 610 of FIG. 6, the RF interface 680 of FIG. 6, or any combination thereof.

The die 736 may be provided to a packaging process 738 where the die 736 is incorporated into a representative package 740. For example, the package 740 may include the single die 736 or multiple dies, such as a system-in-package (SiP) arrangement. The package 740 may be configured to conform to one or more standards or specifications, such as Joint Electron Device Engineering Council (JEDEC) standards.

Information regarding the package 740 may be distributed to various product designers, such as via a component library stored at a computer 746. The computer 746 may include a processor 748, such as one or more processing cores, coupled to a memory 750. A printed circuit board (PCB) tool may be stored as processor executable instructions at the memory 750 to process PCB design information 742 received from a user of the computer 746 via a user interface 744. The PCB design information 742 may include physical positioning information of a packaged semiconductor device on a circuit board, the packaged semiconductor device corresponding to the package 740 including the a device that includes the system 100 of FIG. 1, the circuit 200 of FIG. 2, the pre-emphasis transmitter 102 of FIG. 3, the instructions 656 executable by the processor 610 of FIG. 6, the RF interface 680 of FIG. 6, or any combination thereof.

The computer 746 may be configured to transform the PCB design information 742 to generate a data file, such as a GERBER file 752 with data that includes physical positioning information of a packaged semiconductor device on a circuit board, as well as layout of electrical connections such as traces and vias, where the packaged semiconductor device corresponds to the package 740 including the system 100 of FIG. 1, the circuit 200 of FIG. 2, the pre-emphasis transmitter 102 of FIG. 3, the instructions 656 executable by the processor 610 of FIG. 6, the RF interface 680 of FIG. 6, or any combination thereof. In other embodiments, the data file generated by the transformed PCB design information may have a format other than a GERBER format.

The GERBER file 752 may be received at a board assembly process 754 and used to create PCBs, such as a representative PCB 756, manufactured in accordance with the design information stored within the GERBER file 752. For example, the GERBER file 752 may be uploaded to one or more machines to perform various steps of a PCB production process. The PCB 756 may be populated with electronic components including the package 740 to form a representative printed circuit assembly (PCA) 758.

The PCA 758 may be received at a product manufacture process 760 and integrated into one or more electronic devices, such as a first representative electronic device 762 and a second representative electronic device 764. As an illustrative, non-limiting example, the first representative electronic device 762, the second representative electronic device 764, or both, may be selected from the group of a set top box, a music player, a video player, an entertainment unit, a navigation device, a communications device, a personal digital assistant (PDA), a fixed location data unit, and a computer, into which the system 100 of FIG. 1, the circuit 200 of FIG. 2, the pre-emphasis transmitter 102 of FIG. 3, the instructions 656 executable by the processor 610 of FIG. 6, the RF interface 680 of FIG. 6, or any combination thereof, or any combination thereof may be integrated into the first representative electronic device 762, the second representative electronic device 764, or both. As another illustrative, non-limiting example, one or more of the electronic devices 762 and 764 may be remote units such as mobile phones, handheld personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof. Although FIG. 7 illustrates remote units according to teachings of the disclosure, the disclosure is not limited to these illustrated units. Embodiments of the disclosure may be suitably employed in any device which includes active integrated circuitry including memory and on-chip circuitry.

A device that includes the system 100 of FIG. 1, the circuit 200 of FIG. 2, the pre-emphasis transmitter 102 of FIG. 3, the instructions 656 executable by the processor 610 of FIG. 6, the RF interface 680 of FIG. 6, or any combination thereof, may be fabricated, processed, and incorporated into an electronic device, as described in the illustrative process 700. One or more aspects of the embodiments disclosed with respect to FIGS. 1-6 may be included at various processing stages, such as within the library file 712, the GDSII file 726, and the GERBER file 752, as well as stored at the memory 710 of the research computer 706, the memory 718 of the design computer 714, the memory 750 of the computer 746, the memory of one or more other computers or processors (not shown) used at the various stages, such as at the board assembly process 754, and also incorporated into one or more other physical embodiments such as the mask 732, the die 736, the package 740, the PCA 758, other products such as prototype circuits or devices (not shown), or any combination thereof. Although various representative stages of production from a physical device design to a final product are depicted, in other embodiments fewer stages may be used or additional stages may be included. Similarly, the process 700 may be performed by a single entity or by one or more entities performing various stages of the process 700.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
    detecting one or more of an upward transition of a single-ended data signal via a first driver path to a pre-emphasis transmitter or a downward transition of the single-ended data signal via a second driver path to the pre-emphasis transmitter;
    generating a pre-emphasis pulse at the pre-emphasis transmitter in response to detecting one of the upward transition or the downward transition of the single-ended data signal; and
    combining the pre-emphasis pulse with a differential output of a data transmitter.

2. The method of claim 1, wherein a first delayed data signal is generated when the single-ended data signal propagates through a first delay element of the first driver path, and wherein detecting the upward transition includes comparing a logic level of the first delayed data signal to a logic level of the single-ended data signal at a first exclusive-or (XOR) logic gate.

3. The method of claim 2, wherein the first driver path detects the upward transition when the logic level of the first delayed data signal is low and the logic level of the single-ended data signal is high.

4. The method of claim 3, wherein a second delayed data signal is generated when the single-ended data signal propagates through a second delay element of the second driver path, and wherein detecting the downward transition includes comparing a logic level of the second delayed data signal to the logic level of the single-ended data signal at a second XOR logic gate.

5. The method of claim 4, wherein the second driver path detects the downward transition when the logic level of the second delayed data signal is high and the logic level of the single-ended data signal is low.

6. The method of claim 1, wherein the first driver path transmits a first pre-emphasis input signal to the pre-emphasis transmitter in response to detecting the upward transition and wherein the second driver path transmits a second pre-emphasis input signal to the pre-emphasis transmitter in response to detecting the downward transition.

7. The method of claim 6, wherein generating the pre-emphasis pulse includes activating at least one p-type metal oxide semiconductor (PMOS) transistor of the pre-emphasis transmitter in response to the first pre-emphasis input signal.

8. The method of claim 6, wherein generating the pre-emphasis pulse includes activating at least one n-type metal oxide semiconductor (NMOS) transistor of the pre-emphasis transmitter based on the second pre-emphasis input signal.

9. The method of claim 1, wherein the pre-emphasis pulse is combined with the differential output responsive to the single-ended data signal.

10. The method of claim 1, wherein a strength of the pre-emphasis pulse is based on at least one digital code, and wherein generating the at least one digital code is performed at a processor integrated into an electronic device.

11. An apparatus comprising:
a first driver path configured to detect an upward transition of a single-ended data signal;
a second driver path configured to detect a downward transition of the single-ended data signal;
a pre-emphasis transmitter coupled to the first driver path and to the second driver path, wherein the pre-emphasis transmitter is configured to generate a pre-emphasis pulse in response to the first driver path detecting the upward transition or the second driver path detecting the downward transition; and
a data transmitter configured to provide differential outputs that are combinable with the pre-emphasis pulse to generate combined outputs.

12. The apparatus of claim 11, wherein a width of the pre-emphasis pulse is programmable.

13. The apparatus of claim 12, wherein the width of the pre-emphasis pulse is less than a width of a pulse of the single-ended data signal.

14. The apparatus of claim 11, wherein the first driver path includes a first delay element configured to generate a first delayed data signal relative to the single-ended data signal.

15. The apparatus of claim 14, wherein the first driver path further includes a first exclusive-OR (XOR) logic gate configured to compare a logic level of the first delayed data signal to a logic level of the single-ended data signal.

16. The apparatus of claim 15, wherein a time delay associated with the first delay element is adjustable via a first digital code.

17. The apparatus of claim 16, wherein the second driver path includes a second delay element configured to generate a second delayed data signal relative to the single-ended data signal.

18. The apparatus of claim 17, wherein the second driver path further includes a second XOR logic gate configured to compare a logic level of the second delayed data signal to the logic level of the single-ended data signal.

19. The apparatus of claim 11, wherein the pre-emphasis transmitter includes at least one p-type metal oxide semiconductor (PMOS) transistor configured to generate the pre-emphasis pulse upon activation.

20. The apparatus of claim 19, wherein the at least one PMOS transistor generates the pre-emphasis pulse in response to the first driver path detecting the upward transition of the single-ended data signal.

21. The apparatus of claim 11, wherein the pre-emphasis transmitter includes at least one n-type metal oxide semiconductor (NMOS) transistor configured to generate the pre-emphasis pulse upon activation.

22. The apparatus of claim 21, wherein the at least one NMOS transistor generates the pre-emphasis pulse in response to the second driver path detecting the downward transition of the single-ended data signal.

23. The apparatus of claim 11, wherein the first driver path, the second driver path, the pre-emphasis transmitter, and the data transmitter are integrated into at least one semiconductor die.

24. The apparatus of claim 11, further comprising a device selected from the group consisting of a set top box, a music player, a video player, an entertainment unit, a navigation device, a communications device, a personal digital assistant (PDA), a fixed location data unit, and a computer, into which the first driver path, the second driver path, the data transmitter, and the pre-emphasis transmitter are integrated.

25. The apparatus of claim 11, further comprising a logic gate coupled to the data transmitter, wherein the logic gate is configured to receive the single-ended data signal and a control signal and to provide an output signal to the data transmitter.

26. A non-transitory computer-readable storage medium comprising instructions that, when executed by a processor, cause the processor to:
detect one or more of an upward transition of a single-ended data signal via a first driver path to a pre-emphasis transmitter or a downward transition of the single-ended data signal via a second driver path to the pre-emphasis transmitter;
generate a pre-emphasis pulse at the pre-emphasis transmitter in response to detecting one of the upward transition or the downward transition of the single-ended data signal; and
combine the pre-emphasis pulse with a differential output of a data transmitter.

27. The non-transitory computer-readable storage medium of claim 26, wherein a first delayed data signal is generated when the single-ended data signal propagates through a first delay element of the first driver path, and wherein detecting the upward transition includes comparing a logic level of the first delayed data signal to a logic level of the single-ended data signal at a first exclusive-or (XOR) logic gate.

28. The non-transitory computer-readable storage medium of claim 27, wherein the first driver path detects the upward transition when the logic level of the first delayed data signal is low and the logic level of the single-ended data signal is high.

29. The non-transitory computer-readable storage medium of claim 28, wherein a second delayed data signal is generated when the single-ended data signal propagates through a second delay element of the second driver path, and wherein detecting the downward transition includes comparing a logic level of the second delayed data signal to the logic level of the single-ended data signal at a second XOR logic gate.

30. The non-transitory computer-readable storage medium of claim 29, wherein the second driver path detects the downward transition when the logic level of the second delayed data signal is high and the logic level of the single-ended data signal is low.

31. The non-transitory computer-readable storage medium of claim 26, wherein the instructions are executable by a processor integrated into a device selected from the group consisting of a set top box, a music player, a video player, an entertainment unit, a navigation device, a communications device, a personal digital assistant (PDA), a fixed location data unit, and a computer.

32. An apparatus comprising:
means for detecting an upward transition of a single-ended data signal at a first driver path;
means for detecting a downward transition of the single-ended data signal at a second driver path;

means for generating a pre-emphasis pulse in response to the means for detecting the upward transition or the means for detecting the downward transition; and means for transmitting data that is configured to provide differential outputs, wherein the differential outputs are combinable with the pre-emphasis pulse to generate combined outputs.

33. The apparatus of claim 32, wherein the means for generating the pre-emphasis pulse includes at least one p-type metal oxide semiconductor (PMOS) transistor.

34. The apparatus of claim 32, wherein the means for generating the pre-emphasis pulse includes at least one n-type metal oxide semiconductor (NMOS) transistor.

35. The apparatus of claim 32, further comprising a device selected from the group consisting of a set top box, a music player, a video player, an entertainment unit, a navigation device, a communications device, a personal digital assistant (PDA), a fixed location data unit, and a computer, into which the means for detecting the upward transition, the means for detecting the downward transition, the means for generating, and the means for transmitting are integrated.

36. The apparatus of claim 32, wherein the means for detecting the upward transition, the means for detecting the downward transition, the means for generating, the and means for transmitting are integrated into at least one semiconductor device.

37. A method comprising:
receiving design information representing at least one physical property of a semiconductor device, the semiconductor device comprising:
 a first driver path configured to detect an upward transition of a single-ended data signal;
 a second driver path configured to detect a downward transition of the single-ended data signal;
 a pre-emphasis transmitter coupled to the first driver path and to the second driver path, wherein the pre-emphasis transmitter is configured to generate a pre-emphasis pulse in response to the first driver path detecting the upward transition or the second driver path detecting the downward transition; and
 a data transmitter configured to provide differential outputs that are combinable with the pre-emphasis pulse to generate combined outputs;
transforming the design information to comply with a file format; and
generating a data file including the transformed design information.

38. The method of claim 37, wherein the data file comprises a GDSII format.

39. The method of claim 37, wherein the data file comprises a GERBER format.

* * * * *